United States Patent Office 3,642,800
Patented Feb. 15, 1972

3,642,800
DIBENZO[de,g]QUINOLINE 9(10H) ONES
Norman A. Nelson, Galesburg, and Robert W. Jackson, Portage, Mich., assignors to The Upjohn Company, Kalamazoo, Mich.
No Drawing. Filed July 28, 1969, Ser. No. 845,565
Int. Cl. C07d 33/02
U.S. Cl. 260—286 R          5 Claims

ABSTRACT OF THE DISCLOSURE

This invention relates to novel nitrogen containing ring-D seco steroid transformation products of the following formula and to processes for their preparation:

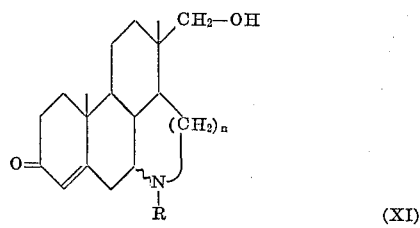

(XI)

wherein $n$ is the whole number 2 or 3 and R is hydrogen or lower-alkyl, and the pharmacologically acceptable acid addition salts thereof. The compounds of the above structural Formula XI are central nervous system stimulants.

SUMMARY OF THE INVENTION

The novel compounds of Formula XI of this invention and the processes for their preparation are illustratively represented by the following sequence of formulae:

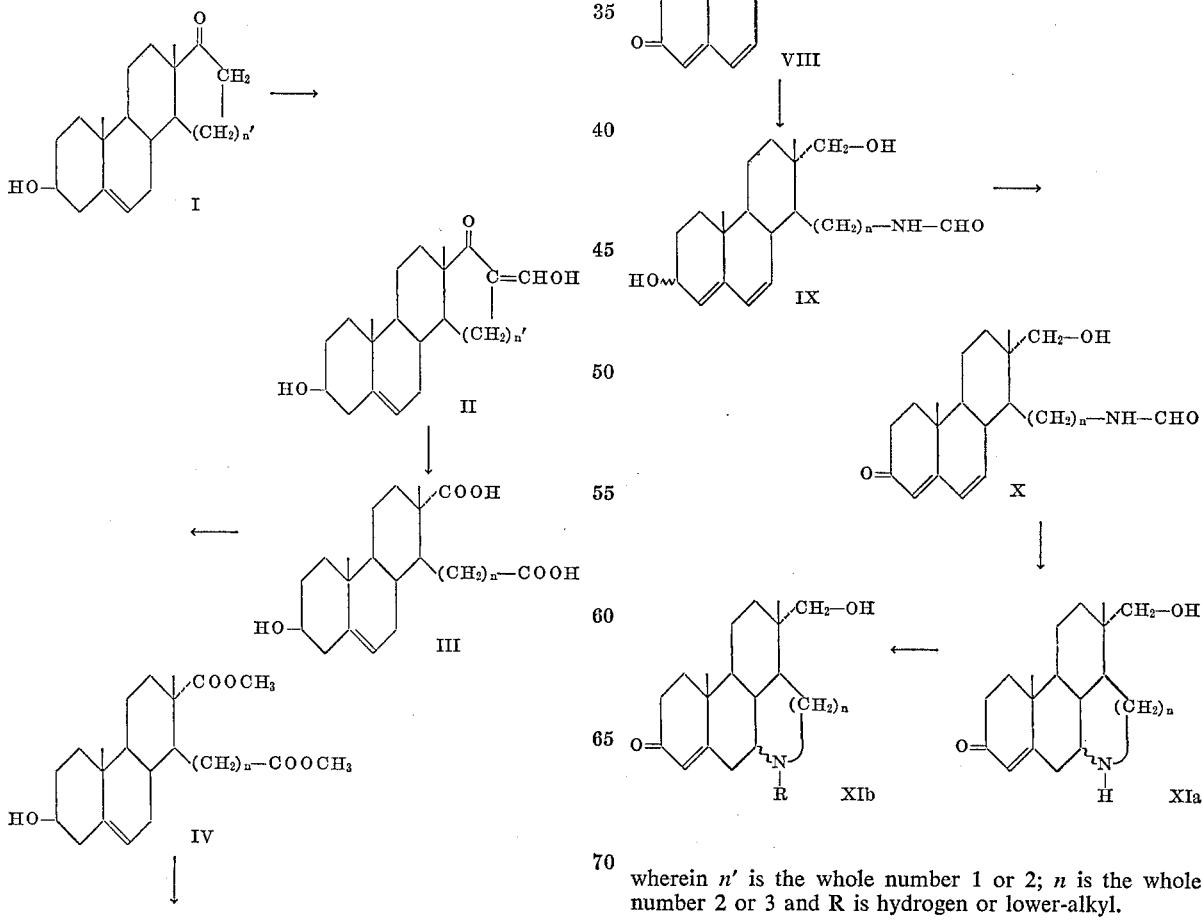

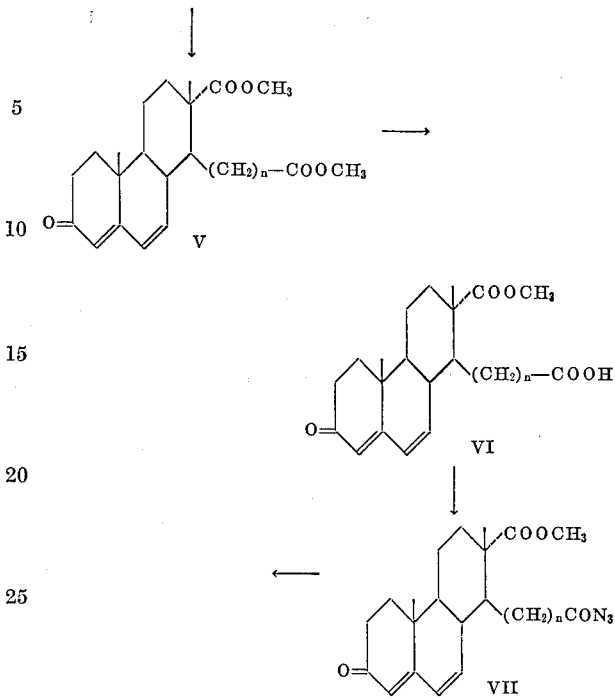

wherein $n'$ is the whole number 1 or 2; $n$ is the whole number 2 or 3 and R is hydrogen or lower-alkyl.

In this application the term "lower-alkyl" means an alkyl radical of 1 to 6 carbon atoms, inclusive, such as methyl, ethyl, propyl, butyl, amyl, hexyl and isomeric forms thereof. The wavy lines appearing in the structural formulae indicate the $\alpha$ (alpha) configuration, the $\beta$ (beta) configuration and mixtures thereof.

Formula XI, above, is a combination of the compounds of Formulas XIa and XIb, which are prepared in accordance with the reaction sequence shown above. The compounds of Formula XI and the acid addition salts thereof are all active central nervous system stimulants useful for modulating the temperament of animals. They can be administered at dosages of about 1 mg./kg. of body weight to produce beneficial responses to environmental stimuli, for modulation of temperament and for the treatment of depression.

Suitable solid dosage forms include tablets, pills, capsules, granules, powders, suppositories, and the like. Advantageously, the pharmaceutical carriers for such solid forms include corn starch, lactose, dicalcium phosphate, terra alba (calcium sulfate), talc, stearic acid, magnesium stearate and gums. Suitable fluid dosage forms include solutions, suspensions, syrups and emulsions. Advantageously the pharmaceutical carrier for such fluid forms comprise water, oils and water-oil emulsions. If desired, suitable dispersing or suspending agents can be included, for example, tragacanth, acacia, alginates, dextran, sodium carboxymethylcellulose, methycellulose, polyvinylpyrrolidone, gelatin and mixtures thereof. Suitable oils for solutions and water-oil emulsions include cottonseed oil, sesame oil, coconut oil and peanut oil.

DETAILED DESCRIPTION OF THE INVENTION

The starting materials for the process of this invention, dehydroepiandrosterone (I) and D-homodehydroepiandrosterone (I), are known in the art.

In carrying out the process of this invention, the selected Compound (I) is treated with ethyl formate and an alkali metal hydride such as sodium, potassium or lithium hydride for about 24 hours at room temperature (about 20-35° C.) to give the corresponding 16-hydroxymethylene derivative (II), which is recovered from the reaction mixture by conventional methods. For example, the reaction mixture is diluted with water, acidified and the precipitated product thus obtained is isolated by filtration.

The 16-hydroxymethylene compound thus obtained is then subjected to oxidative cleavage with retention of all of the carbon atoms. The selected 16-hydroxymethylene Compound II in a suitable inert organic solvent or solvent mixture, e.g., methanol, ethanol, tetrahydrofuran, methylene chloride mixtures thereof, and the like, methanol-methylene chloride is preferred, is treated with 30% hydrogen peroxide in the presence of a small amount of base, sodium or potassium hydroxide is preferred to obtain the corresponding diacids III, which are recovered by conventional methods, for example, the reaction mixture is concentrated, diluted with water and the product recovered by filtration.

The diacids III are then converted to their corresponding dimethyl esters IV in accordince with known methods, for example, by reaction with excess ethereal diazomethane in a suitable organic solvent such as tetrahydrofuran, ether, methylene chloride, methanol, mixtures thereof, and the like. When the reaction is complete, the excess diazomethane is destroyed with acetic acid and the product is isolated and purified by conventional methods, for example, chromatography or by crystallization from a suitable solvent. Alternatively, the diacid III can be converted to the diester IV using standard esterification conditions, for example, using methanol in the presence of a mineral acid such as sulfuric acid.

The diester IV, thus obtained, is then subjected to an Oppenauer oxidation-dehydration reaction in accordance with known methods [Leon Mandell, J. Am. Chem. Soc. 78, 3199 (1956)]. For example, a mixture of the selected Compound IV, benzoquinone and aluminum t-butoxide or aluminum isopropoxide in benzene is heated under reflux for about 45 minutes and the product V is isolated by conventional methods.

The compounds of Formula V are then subjected to a selective ester hydrolysis in accordance with the procedure of Kiersted et al., J. Med. Chem. 10, 117 (1967). The selected diester V is heated at reflux for about 1 hour in an aqueous alkanolic sodium or potassium hydroxide solution, e.g., methanolic sodium hydroxide, and the product VI, thus obtained is recovered from the reaction mixture by conventional methods, for example, by extraction with a suitable organic solvent such as methylene chloride or ether.

The mono acid VI, thus obtained, is then converted to the corresponding acid azide VII in accordance with the method of J. Weinstock, J. Org. Chem. 26, 3511 (1961); the selected monocarboxylic acid VI is treated with an equivalent amount of a trialkyl amine such as triethylamine and an alkyl chloroformate, such as methyl chloroformate, ethyl chloroformate, isobutyl chloroformate, and the like, in an aqueous organic solvent such as acetone to give a mixture of carboxylic-carbonic anhydrides which are then reacted with sodium azide to give the acid azides of Formula VII.

The acid azide VII is then subjected to a standard Curtius rearrangement [P.A.S. Smith, Org. Reactions III, 337 (1946)] which involves heating the acid azide in an inert dry solvent, such as benzene, toluene, tetrahydrofuran, dioxane, and the like, until nitrogen evolution ceases, to obtain the corresponding isocyanate VIII, which can be isolated from the reaction medium and purified if desired by known methods such as crystallization.

The isocyanate VII is then treated with lithium aluminum hydride in accordance with methods known in the art to obtain the corresponding compounds of Formula IX. The lithium aluminum hydride reduction is carried out in the presence of an inert solvent such as ether, dioxane, tetrahydrofuran, mixtures thereof, and the like. The reaction is carried out at ambient temperatures, about 20° C. to about 35° C. is preferred for a period of about 30 to 60 minutes or until the reduction is complete. The product IX is recovered from the reaction mixture and purified by conventional methods such as chromatography.

The compounds of Formula IX are then selectively oxidized with activated manganese dioxide in a suitable solvent such as chloroform, ethyl acetate, benzene, acetone, methylene chloride and the like, to obtain the corresponding Compound X, which is recovered and purified by conventional methods such as chromatography. The oxidation can be carried out within a wide temperature range, such as from about 0° C. to about 100° C.; however, it is preferable to carry out the reaction within the range of about 15° C. to about 35° C.; about room temperature for a period of about 24 hours is advantageous.

The N-formyl Compound X, thus obtained, is then treated with a base to hydrolyze the N-formyl group to give the corresponding amine which under basic conditions undergoes a Michael addition reaction to effect ring closure. Illustrative of bases which can be used are sodium or potassium hydroxide in alcohols or aqueous alcohols; quaternary ammonium hydroxides; alkali earth hydroxides such as barium or calcium hydroxide, and the like. The reaction is advantageously conducted in an aqueous organic or organic solvent such as alcohol, e.g., methanol, ethanol, propanol, isopropanol, butanol and tert.-butanol; tetrahydrofuran, dioxane or other suitable solvent. The ring closure can be carried out within a broad temperature range such as from about —10° C. to the boiling point of the reaction mixture. Temperatures within the range of from about 0° C. to about 30° C. are especially advantageous. The compounds of Formula XIa, thus obtained, can be recovered from the reaction mixture and purified in accordance with conventional methods such as chromatography and/or crystallization from a suitable solvent. If desired, it is often advantageous to recover the product XIa as an acid addition salt.

The compounds of Formula XIa are converted to the corresponding 6-alkyl compounds Formula XIb by reacting the selected compound with an alkylating agent in an inert solvent such as ether, tetrahydrofuran, dioxane, benzene, toluene, alkanols, e.g., methanol, ethanol, isopropanol, t. butanol, and the like. Alkylating agents which can be used are alkyl halides of the formula $R_1X$ wherein $R_1$ is alkyl and X is chlorine, bromine or iodine, alkyl tosylates, alkyl organic sulfonates and the like, for example, methyl iodide, ethyl bromide, propyl iodide, butyl bromide, N-propyl-p-toluenesulfonate, butyl methanesulfonate, etc. The compounds of Formula XIb are recovered and purified by conventional methods.

The compounds of Formulas XIa and XIb, represented collectively as XI, are converted to their pharmacologically acceptable acid addition salts in the usual manner, that is, by directly reacting the selective acid with the free amine, preferably in an aqueous or anhydrous solvent such as ether, methanol, ethanol, ethyl acetate or the like. Evaporation of the solvent provides the desired acid addition salt. Useful salts thus prepared include the hydrochlorides, hydrobromides, hydroiodides, sulfates, phosphates, acetates, lactates, tartrates, cyclohexanesulfamates, pamoates, citrates, benzenesulfonates, methanesulfonates, and the like.

The following examples illustrate the best mode contemplated by the inventors for carrying out their invention, but are not to be construed as limiting the scope thereof.

EXAMPLE 1

16-(hydroxymethylene) androstenolone (II)

A solution of 132 g. dehydroepiandrosterone (the compound of Formula I, wherein $n'$ is 1) in about 1320 ml. of benzene is treated with 66 ml. of ethylformate and 39.5 g. of sodium hydride for about 24 hours at room temperature (about 25° C.). The mixture is then diluted with water and the aqueous layer is separated from the organic layer. The aqueous layer is acidified with dilute hydrochloric acid and the precipitate thus obtained is recovered by filtration to give 144 g. of 16-(hydroxymethylene) androstenolone, M.P. 236–241°.

EXAMPLE 2

2 - carboxy - 1,2,3,4,4a,4b,5,6,7,8,10,10a - dodecahydro-7-hydroxy-2,4b-dimethyl-1-phenanthrene propionic acid (III)

To a suspension of 106 g. (0.335 mole) of 16-(hydroxymethylene) androstenolone in 2000 ml. of methanol and 1000 ml. of methylene chloride is added, in one portion, 320 ml. of 30% hydrogen peroxide and 0.5 ml. of 10% aqueous sodium hydroxide at room temperature. The mixture is stirred under nitrogen for 5 hours at room temperature, after which approximately one-half of the solvent is removed at reduced pressure (maximum temperature 30° C.). The mixture is diluted with 7 l. of water and allowed to stand at 5° C. for 18 hours. Filtration afforded, after drying at 80° under vacuum for one day, 115 g. (98%) of 2-carboxyl-1,2,3,4,4a,4b,5,6,7,8,10,10a-dodecahydro-7-hydroxy-2,4b-dimethyl - 1 - phenanthrene propionic acid, M.P. 223–227° C.

EXAMPLE 3

2-carboxy-1,2,3,4,4a,4b,5,6,7,8,10,10a-dodecahydro-7 - hydroxy-2,4b - dimethyl - 1 - phenanthrenepropionic acid, dimethyl ester (IV)

A suspension of 55 g. (0.157 mole) of 2-carboxy-1,2,3,4,4a,4b,5,6,7,8,10,10a-dodecahydro - 7 - hydroxy-2,4b-dimethyl-1-phenanthrenepropionic acid in 800 ml. of anhydrous ether is treated with ethereal diazomethane added in small portions over one hour until the yellow color remains and nitrogen evolution ceases. Then 5 ml. of glacial acetic acid is added to destroy the excess diazomethane and most of the solvent is removed at reduced pressure. The precipitate thus obtained is recovered by filtration to give 40 g. (67% yield) of 2-carboxy-1,2,3,4,4a,4b,5,6,7,8,10,10a-dodecahydro - 7 - hydroxy-2,4b-dimethyl-1-phenanthrenepropionic acid, dimethyl ester, M.P. 126–127° C.; an analytical sample is prepared by recrystallization from ether-hexane, M.P. 129–130° C.; the IR ($\nu$ max 1725, 1710 cm. $^{-1}$), NMR, and mass (calcd. 378.2406; found 378.2428) spectra are consistent with the structure.

Analysis.—Calcd. for $C_{22}H_{34}O_5$ (percent): C, 69.81; H, 9.05. Found (percent): C, 69.55; H, 8.96.

EXAMPLE 4

2-carboxy - 1,2,3,4,4a,4b,5,6,7,10a - decahydro - 2,4b - dimethyl-7-oxo-1-phenanthrenepropionic acid, dimethyl ester (V)

A solution of 5 g. of 2-carboxy-1,2,3,4,4a,4b,5,6,7,8,10,10a - dodecahydro - 7 - hydroxy-2,4b-dimethyl-1-phenanthrenepropionic acid, dimethyl ester, in 350 ml. of benzene and 15 g. of benzoquinone (freshly recrystallized from ethylene dichloride) is refluxed under a water trap for 15 minutes and approximately 125 ml. of benzene is withdrawn from the bottom of the trap during this period. The reaction mixture is then cooled enough to stop the refluxing and 4.25 g. of aluminum t-butoxide is added. The refluxing and stirring is commenced again and continued for 45 minutes. The reaction mixture is then diluted with 250 ml. of water and steam distilled until all of the benzene is removed. The mixture is cooled to 20° C. by the addition of ice and 250 ml. of N/1 sulfuric acid is added. Ether, 200 ml. is added and the mixture is stirred for 15 minutes and then filtered through a pad of Celite filter aid (diatomaceous earth). The residue is rinsed with ether and the filtrate is placed in a separatory funnel and the ether phase is separated. The aqueous phase is saturated with sodium chloride and again extracted with three 100 ml. portions of ether. These extracts are added to the first ether extract and the quinone is removed from the mixture by repeated washings with dilute aqueous potassium hydroxide solution. The ether layer is then dried over anhydrous sodium sulfate and concentrated by distillation in vacuo to give 4.2 g. of 2-carboxy-1,2,3,4,4a,4b,5,6,7,10a-decahydro-2,4b-dimethyl - 7 - oxo-1-phenanthrenepropionic acid, dimethyl ester, ultraviolet spectra shows a peak at 285 mm. The product thus obtained is dissolved in 50 ml. of methylene chloride and chromatographed over 320 g. of Florisil wet packed in Skellysolve B hexanes. The column is eluted with 100 ml. portions of mixtures of acetone in Skellysolve B. Fractions eluted with 15% acetone in Skellysolve B gives 3.11 g. of 2-carboxy-1,2,3,4,4a,4b,5,6,7,10a-decahydro - 2,4b - dimethyl-7-oxo-1-phenanthrenepropionic acid, dimethyl ester as a pale amber glass, infrared and NMR spectra are in agreement with the structure.

EXAMPLE 5

2-carboxy - 1,2,3,4,4a,4b,5,6,7,10a- - decahydro - 2b-dimethyl-7-oxo-1-phenanthrenepropionic acid, 2-methyl ester (VI)

A solution of 3.1 g. of 2-carboxy-1,2,3,4,4a,4b,5,6,7,10a - decahydro - 2,4b - dimethyl-7-oxo-1-phenanthrenepropionic acid, dimethyl ester in about 50 ml. of methanol is purged with nitrogen for 5 minutes and treated with a solution of 3.0 g. of potassium hydroxide in 30 ml. of water which has been purged in the same manner. The reaction mixture is then refluxed in a nitrogen atmosphere for about one hour. Most of the methanol is then removed by distillation in vacuo and residue is diluted with 100 ml. of ice and water and extracted twice with 30 ml. portions of a mixture of 3 parts ether to 1 part methylene chloride. The aqueous layer is separated and acidified with ice cold dilute hydrochloric acid. The product is extracted with ether, dried over anhydrous sodium sulfate and concentrated by distillation in vacuo to give 2.3 g. of 2-carboxy-1,2,3,4,4a,4b,5,6,7,10a-decahydro-2,4b-dimethyl-7-oxo-1-phenanthrenepropionic acid, 2-methyl ester, the infrared and NMR spectra are in agreement with the structure.

EXAMPLE 6

1(2-cyanatoethyl) - 1,2,3,4,4a,4b,5,6,7,10a - decahydro-2,4b-dimethyl-7-oxo-2-phenanthrene carboxylic acid, methyl ester (VIII)

A solution of 3,4 g. (10 millimoles) of 2-carboxy-1,2,3,4,4a,4b,5,6,7,10a - decahydro - 2,4b - dimethyl-7-oxo-1-phenanthrenepropionic acid, methyl ester in 55 ml. of acetone and 4.5 g. of water is treated with 1.11 g. (11.0 millimoles) of triethylamine. The mixture is cooled to —5° C. and 1.5 g. (11 millimoles) of isobutylchloroformate which has been cooled to about 0° C. is added. The mixture is then stirred at about 0° C. for about 30 minutes and a solution of 3.2 g. of sodium azide in 16 ml. of water is added. After stirring the mixture at about 0° C. for about 1 hour, 100 ml. of water is added and the acid azide (VII) thus obtained, is extracted with methylene chloride. The extract is washed successively with water, dilute potassium bicarbonate solution, water, and finally with saturated sodium chloride solution. The washed extract is dried over anhydrous sodium sulfate and concentrated by distillation in vacuo from a water bath at 25–30° C. to give 3.4 g. of the corresponding acid azide VII, the infrared spectrum is in agreement with the structure.

The acid azide (VII) thus obtained is taken up in 150 ml. of benzene and distilled in vacuo from a water bath at 25–30° C. until the volume is reduced by 30–40 ml. to remove traces of water. The solution is then refluxed on a steam bath for 20 minutes and the acid azide is converted, with the evolution of nitrogen, to the "isocyanate." The "isocyanate" is isolated by distillation of the solvent in vacuo from a steam bath to give 2.8 g. of 1(2-cyanatoethyl) - 1,2,3,4,4a,4b,5,6,7,10a-decahydro-2,4b - dimethyl - 7 - oxo - 2 - phenanthrene carboxylic acid, methyl ester; infrared and NMR spectra confirm the structure.

EXAMPLE 7

N - [1,2,3,4,4a,4b,5,6,7,10a - decahydro-7-hydroxy-2-(hydroxymethyl) - 2,4b - dimethyl - 1 - phenanthryl] ethyl] formamide (IX)

A solution of 8.0 g. of 1-(2-cyanatoethyl)-1,2,3,4,4a,4b,5,6,7,10a - decahydro - 2,4b - dimethyl - 7-oxo-2-phenanthrenecarboxylic acid, methyl ester in 250 ml. of dry tetrahydrofuran is added slowly to a stirred suspension of 5.0 g. of lithium aluminum hydride in 500 ml. of anhydrous ether. The reaction is allowed to proceed at ambient temperature in a nitrogen atmosphere and protected from atmospheric moisture for 40 minutes. The excess metal hydride is decomposed by the cautious addition of 100 ml. of a solution of 60 ml. of water and 100 ml. of tetrahydrofuran. The precipitated inorganic salts are removed from the reaction mixture by filtration and washed with tetrahydrofuran. The filtrate and washes are combined and concentrated by distillation in vacuo. The residue thus obtained, 8.1 g., is dissolved in 50 ml. of methanol and 50 ml. of methylene chloride, mixed with 100 g. of silica gel and dried in vacuo at 40° C. to remove the solvents. This material is then placed on a column of 800 g. of silica gel wet packed in 8% methanol in methylene chloride. The column is eluted with 200 ml. portions of mixtures of methanol in methylene chloride. The fractions eluted with 12.5% methanol in methylene chloride give 3.36 g. of N-[1,2,3,4,4a,4b,5,6,7,10a-decahydro-7-hydroxy - 2 - (hydroxymethyl) - 2,4b - dimethyl-1-phenanthryl] ethyl] formamide; an analytical sample is recrystallized from acetone, M.P. 157–160° C.; $\lambda_{max.}^{EtOH}$ 233 $\epsilon$ 18,900, 239.5 $\epsilon$ 21,200, 247 sh. $\epsilon$ 13,950, and 284 m$\mu$ $\epsilon$ 1,350; infrared and NMR spectra confirm the structure.

*Analysis.*—Calcd. for $C_{20}H_3NO_3$ (percent): C, 72.04; H, 9.37; N, 4.20. Found (percent): C, 71.72; H, 9.63; N, 4.57.

EXAMPLE 8

N - [2[1,2,3,4,4a,4b,5,6,7,10a - decahydro-7-oxo-2-(hydroxymethyl) - 2,4b - dimethyl-1-phenanthryl]ethyl] formamide (X)

A suspension of 9.88 g. of N-[2[1,2,3,4,4a,4b,5,6,7,10a - decahydro - 7 - (hydroxymethyl)-2,4b-dimethyl-1-phenanthryl] ethyl] formamide in 1800 ml. of initially warmed ethyl acetate is treated with 22.8 g. of activated manganese dioxide at room temperature about 25° C. for 24 hours. The excess manganese dioxide is removed by filtration and washed with hot ethyl acetate. The combined washes and filtrate are concentrated by distillation in vacuo to give 9.4 g. of N-[2[1,2,3,4,4a,4b,5,6,7,10a-decahydro - 7 - oxo - 2 - (hydroxymethyl)-2,4b-dimethyl-1-phenanthryl] ethyl] formamide as an amorphous glass, which is dissolved in methylene chloride and mixed with 80.0 g. of silica gel; the solvent is removed in a vacuum oven at 40° C. and the mixture is placed on a column of 900 g. of silica gel wet packed in 8% methanol in methylene chloride. The column is eluted with 200 ml. fractions of 10% methanol in methylene chloride to give 7.77 g. of N-[2[1,2,3,4,4a,4b,5,6,7,10a-decahydro-7-oxo-2-(hydroxymethyl) - 2,4b-dimethyl-1-phenanthryl] ethyl] formamide; this material is non-crystalline and is characterized by infrared and NMR spectroscopy.

EXAMPLE 9

2,3,3a,4,5,6,6a,7,11,11a,11b,12 - dodecahydro - 3 - (hydroxymethyl) - 3,11a - dimethyl - 1 - H dibenzo[de,g]-quinolin-9(10H)-one (XIa) and the hydrochloride salt thereof A solution of 7.76 g. of N - [2[1,2,3,4,4a,4b,5,6,7,10a-decahydro - 7 - hydroxy - 2 - (hydroxymethyl) - 2,4b-dimethyl - 1 - phenanthryl]ethyl]formamide in 970 ml. of methanol is purged of air by bubbling nitrogen through it for 5 minutes. This solution is added to a solution of 2.0 g. of potassium hydroxide in 200 ml. of water which has been purged of air in the same manner. The reaction mixture is refluxed in a nitrogen atmosphere for about 12 hours. The reaction mixture is then diluted with 500 ml. of water and distilled in vacuo from a steam bath until most of the methanol is removed. The crude product partially precipitates and the mixture is cooled and saturated with sodium chloride. The organic material is extracted with 3 portions of 200 ml. of 1—1 methylene chloride-tetrahydrofuran. The extract is washed twice with saturated sodium chloride, dried over anhydrous sodium sulfate and concentrated by distillation in vacuo to 7.3 g. of an amorphous residue. The residue thus obtained is dissolved in 50 ml. of methanol, mixed with 75 g. of Sili-Car CC7, (silica gel-Mallinckrodt), and chromatographed over 700 g. of silica gel wet packed in 10% methanol in methylene chloride. The column is eluted with 100 ml. fractions of 10% methanol and 1% triethylamine in methylene chloride. The fractions which are shown by ultraviolet and NMR spectra to contain the desired product give 3.92 g. of 2,3,3a,4,5,6,6a,7,11,11a,11b,12 - dodecahydro - 3 - (hydroxymethyl) - 3,11a-dimethyl - 1 - H dibenzo[de,g]quinoline - 9(10H)-one. The product thus obtained is dissolved in 30 ml. of methanol and acidified with 50 ml. of dilute (5%) hydrochloric acid. The solution is extracted 3 times with 50 ml. portions of ether to remove any neutral material. The aqueous phase is made basic with N/1 sodium hydroxide and the free amine is extracted with methylene chloride. The extract is dried over anhydrous sodium sulfate and concentrated by distillation in vacuo from a water bath at 40° C. to give 3.28 of amorphous 2,3,3a,4,5,6,6a,7,11, 11a,11b,12 - dodecahydro - 3 - (hydroxymethyl) - 3,11a-dimethyl - 1 - H dibenzo[de,g]quinolin - 9(10H) - one (XI). The hydrochloride is prepared by dissolving the free amine thus obtained in 50 ml. of methylene chloride, diluting the solution with 150 ml. of ether and adding an excess of anhydrous hydrogen chloride in ether. The precipitated hydrochloride salt thus obtained is filtered, washed thoroughly with ether and dried in vacuo to give 3.47 g. of the hydrochloride which is recrystallized from 5% ethanol in chloroform to give 3.17 g. of 2,3,3a,4,5,6,6a,7,11,11a,11b,12 - dodecahydro - 3 - (hydroxymethyl( - 3,11a - dimethyl - 1 - H dibenzo[de,g]quinolin-9(10H)-one, hydrochloride, a white crystalline solid M.P. over 280° C. (dec.);

$\lambda_{max.}^{EtOH}$

236 ε 14,350; infrared and NMR spectra and the mass spectrum support the structure. This particular sample had 7.14% water content.

*Analysis.*—Calcd. for $C_{19}H_{30}ClNO_2 \cdot 7.14\% H_2O$ (percent): C, 62.34; H, 9.05; Cl, 9.68; N, 4.12. Found (percent): C, 61.05; H, 9.06; Cl, 9.82; N, 4.10.

In the same manner substituting D-homodehydroepiandrosterone (the compound of Formula I, wherein $n'$ is 2) in place of dehydroepiandrosterone in Example 1, above, and following the procedures of Examples 1–9, there is obtained the corresponding compound of Formula XIa wherein $n$ is 3, namely 2,3,3a,4,5,6,7,7a,8,11,12,12a,12b,12c - tetradecahydro - 3 - (hydroxymethyl)-3,12a - dimethylphenanthro[10,1 - bc]azepin - 10(1H)-one and the hydrochloride thereof.

EXAMPLE 10

2,3,3a,4,5,6,6a,7,11,11a,11b,12 - dodecahydro - 3 - (hydioxymethyl) - 3,6,11a - trimethyl - 1 - H dibenzo[de,g]quinolin-9(10H)-one and the hydrochloride salt thereof (XII)

A solution of 3.0 g. of 2,3,3a,4,5,6,6a,7,11,11a,11b,12-dodecahydro - 3 - (hydroxymethyl) - 3,11a - dimethyl - 1 - H dibenzo[de,g]quinolin-9(10H)-one in tetrahydrofuran is treated with 1.4 g. of methyl iodide in the presence of 2.0 g. of powdered calcium carbonate. The reaction mixture is filtered and the filtrate concentrated in vacuo. The residue so obtained is chromatographed on silica gel and eluted with increasing amounts of methanol in methylene chloride to give 2,3,3a,4,5,6,6a,7,11,11a,11b,12 - dodecahydro - 3 - (hydroxymethyl) - 3,5,11a - trimethyl - 1 - H dibenzo[de,g]-quinolin-9(10H)-one.

The free amine thus obtained in dissolved in methylene chloride, diluted with ether and treated with anhydrous hydrogen chloride in ether in the manner described in Example 9, above, to give 2,3,3a,4,5,6,6a,7,11,11a,11b,12-dodecahydro - 3 - (hydroxymethyl) - 3,6,11a - trimethyl-1-H dibenzo[de,g]quinolin-9(10H)-one, hydrochloride.

In the same manner substituting 2,3,3a,4,5,6,7,7a,8,11,12,12a,12b,12c - tetradecahydro - 3 - (hydroxymethyl)-3,12a - dimethylphenanthro[10,1 - bc]azepin - 10(1H)-one as starting material in Example 10, there is obtained the corresponding compounds of Formula X, wherein $n$ is 3, namely 2,3,3a,4,5,6,7,7a,8,11,12,12a,12b,12c-tetradecahydro - 3 - (hydroxymethyl) - 3,7,12a - trimethylphenanthro[10,1-bc]azepin-10(1H)-one and the hydrochloride thereof.

EXAMPLE 11

17-aza-D-homoandrosta-4,6-diene-3,17a-dione

A solution of 2.8 g. of 1(2-cyanatoethyl)-1,2,3,4,4a,4b,5,6,7,10a - decahydro - 2,4b - dimethyl - 7 - oxo - 2-phenanthrenecarboxylic acid, methyl ester in 35 ml. of acetic acid and 10 ml. of water is treated at room temperature with 9.5 ml. of concentrated hydrochloric acid for about 16 hours. The reaction mixture is distilled in vacuo until most of the acetic acid and hydrochloric acid are removed. The residue thus obtained is taken up in 60 ml. of ether and 25 ml. of methylene chloride, stirred vigorously and adjusted to approximately pH 12 with dilute potassium hydroxide solution. The reaction mixture is stirred under a nitrogen atmosphere for about 2 hours to complete the ring closure. The organic layer is separated, washed with water until neutral and dried over sodium sulfate. The extract is concentrated by distillation in vacuo and the residue thus obtained, 17-aza-D-homoandrosta-4,6-diene-3,17a-dione, is purified by chromatography over 200 g. of Florisil (synthetic magnesium silicate) wet packed in Skellysolve B hexanes. A peak of 20 fractions eluted with 50 ml. portions of 50% acetone in Skellysolve B gives 0.851 g. of product which is recrystallized from ethylacetate to give 0.56 g. of 17-aza-D-homoandrosta - 4,6 - diene-3,17a - dione, M.P. 215°–218° C.;

$\lambda_{max.}^{EtOH}$

283 ε 24,300; NMR spectra supports the structure.

*Analysis.*—Calcd. for $C_{19}H_{25}NO_2$ (percent): C, 76.22; H, 8.42; N, 4.68. Found (percent): C, 75.55; H, 8.57; N, 4.60.

Mass spec. calculated: 299.188. Found: 299.187.

The 17 - aza - D - homoandrosta - 4,6 - diene - 3,17a-dione thus obtained, is a central nervous system stimulant and is useful for the same purposes as hereintofore disclosed for the compounds of Formula XI.

What is claimed is:

1. A compound of the formula:

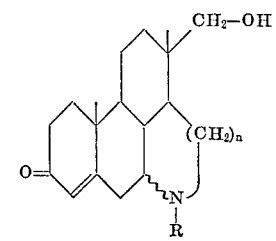

I wherein $n$ is the whole number 2 or 3 and R is hydrogen or a lower-alkyl of from 1 to 6 carbon atoms, inclusive, and the pharmacologically acceptable acid addition salts thereof.

2. 2,3,3a,4,5,6,6a,7,11,11a,11b,12 - dodecahydro-3-(hydroxymethyl) - 3,11a - dimethyl-1-H dibenzo[de,g]quinolin-9(10H)-one, the compound of claim 1, wherein $n$ is 2 and R is hydrogen.

3. 2,3,3a,4,5,6,7,11,11a,11b,12 - dodecahydro - 3-(hydroxymethyl) - 3,11a - dimethyl-1-H dibenzo[de,g]quinolin-9(10H)-one, hydrochloride, the compound of claim 1, wherein $n$ is 2, R is hydrogen and the acid addition salt is the hydrochloride.

4. The process for the preparation of a compound of the formula:

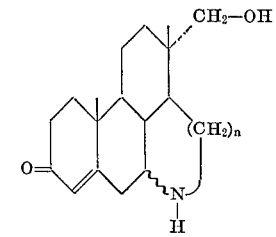

II wherein $n$ is the whole number 2 or 3, which comprises subjecting a compound of the formula:

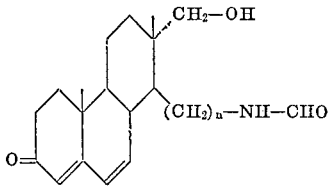

wherein $n$ has the meaning given above, to hydrolysis and ring closure under basic conditions.

5. The process of claim 4, for the preparation of 2,3,3a,4,5,6,6a,7,11,11a,11b,12 - dodecahydro - 3 - (hydroxymethyl) - 3 - 11β-dimethyl-1-H dibenzo[de,g]quinolin-9(10H)-one, wherein the starting compound is N-[2[1,2,3,4,4a,4b,5,6,7,10a - decahydro - 7-hydroxy-2-(hydroxy - methyl) - 2,4b - dimethyl-1-phenanthryl]ethyl] formamide.

References Cited

UNITED STATES PATENTS 3,138,584  6/1964  Zderic _____ 260—239

FOREIGN PATENTS 885,960  1/1962  Great Britain _____ 260—288

DONALD G. DAUS, Primary Examiner

U.S. Cl. X.R.

260—239 BB, 289 A2, 289 R, 397.3, 349, 464, 468.5, 514.5, 561 R, 586 H; 424—258

2541

UNITED STATES PATENT OFFICE
CERTIFICATE OF CORRECTION

Patent No. 3,642,800          Dated February 15, 1972

Inventor(s) Norman A. Nelson and Robert W. Jackson

It is certified that error appears in the above-identified patent and that said Letters Patent are hereby corrected as shown below:

Column 8, line 12 for "7-(hydroxymethyl)-" read --7-hydroxy-2- --. Column 10, line 55 for "6,7" read --6,6a,7--.

Signed and sealed this 11th day of July 1972.

(SEAL)
Attest:

EDWARD M. FLETCHER, JR.           ROBERT GOTTSCHALK
Attesting Officer          Commissioner of Patents